(12) United States Patent
Helm et al.

(10) Patent No.: US 6,503,074 B2
(45) Date of Patent: Jan. 7, 2003

(54) CLAMPING CYLINDER FOR A CYLINDRICAL STAMPING MOLD APPARATUS

(75) Inventors: Ferdinand Helm, Weiden (DE); Hubert Stahl, Waldthurn (DE)

(73) Assignee: Hueck Folien GmbH & Co. KG, Pirk (DE)

( * ) Notice: Subject to any disclaimer, the term of this patent is extended or adjusted under 35 U.S.C. 154(b) by 0 days.

(21) Appl. No.: 09/924,095

(22) Filed: Aug. 8, 2001

(65) Prior Publication Data

US 2002/0022067 A1 Feb. 21, 2002

(30) Foreign Application Priority Data

Aug. 16, 2000  (DE) .......................................... 100 39 744

(51) Int. Cl.[7] .............................................. B29C 33/44
(52) U.S. Cl. ...................... 425/194; 425/193; 425/363; 425/471
(58) Field of Search .................. 425/194, 363, 425/471, 193; 264/1.31

(56) References Cited

U.S. PATENT DOCUMENTS

| 2,484,670 A | * | 10/1949 | Barker ........................ 384/127 |
| 2,776,452 A | * | 1/1957 | Chavannes ................... 264/284 |
| 3,555,601 A | * | 1/1971 | Price ............................ 165/89 |
| 4,212,609 A | * | 7/1980 | Fay ............................. 425/100 |
| 4,726,871 A | * | 2/1988 | Husges et al. .............. 156/389 |
| 5,971,738 A | * | 10/1999 | Jens et al. ................... 425/194 |
| 6,074,192 A | * | 6/2000 | Mikkelsen ................... 425/327 |

* cited by examiner

Primary Examiner—Nam Nguyen
Assistant Examiner—Brian L Mutschler
(74) Attorney, Agent, or Firm—Browdy and Neimark

(57) ABSTRACT

In a clamping cylinder for receiving and fixing a cylindrical stamping mold with a structured surface, for instance for the production of holograms, comprising an outer cylinder casing which is closed by frontal covers and mounted on a shaft, it is provided that the cylinder casing is equipped with a plurality of bores, which are connected with compressed-air lines that lead through the interior of the cylinder casing and are connectable to a compressed-air source, and that, inside the cylinder casing, a cavity is provided for a temperature control medium, which circulates via inlets and outlets.

7 Claims, 4 Drawing Sheets

CLAMPING CYLINDER FOR A CYLINDRICAL STAMPING MOLD APPARATUS

BACKGROUND OF THE INVENTION

1. Field of the Invention

The invention relates to a clamping cylinder for receiving and fixing a cylindrical stamping mold with a structured surface, for instance for the production of holograms, cinegrams, exelgrams for safety and reliability engineering or for decoration purposes, comprising an outer cylinder casing, which is closed by frontal covers and mounted on a shaft.

2. Background Art

It has been known to accompany the stamping process with an external supply of heat, for instance in order to enable the stamped structure to solidify or to accelerate solidification.

As opposed to this, the invention is based on the idea that considerably improved results can be obtained by the stamping mold being heated to a temperature that has been determined to be optimal.

SUMMARY OF THE INVENTION

It is an object of the invention to embody a clamping cylinder in such a way that temperature control of the stamping mold can be put into practice and that, simultaneously, the stamping mold can easily be mounted and adjusted on the clamping cylinder.

According to the invention, this object is attained by the cylinder casing being provided with a plurality of bores, which are connected with compressed-air lines that lead through the interior of the cylinder casing and are connectable to a compressed-air source, and by a cavity for a temperature control medium being provided inside the cylinder casing, with the temperature control medium circulating via inlets and outlets.

Based on the design according to the invention, it is possible to cool and to heat the clamping cylinder and, thus, the stamping mold and, in this way, to set a desired, given temperature. Controlling the supply of compressed air enables the stamping cylinder, by elastic expansion, to be fixed in any position or the position thereof to be corrected.

In keeping with another embodiment of the invention, it is provided that the compressed-air lines pass through the cavity for the temperature control medium, which helps realize a compact structure at a low cost.

The compressed air may be supplied through distributing lines, which may be formed in one of the covers that close the cylinder casing.

By advantage, the shaft is a hollow shaft, having a cavity for the supply of the temperature control medium and a cavity for the discharge thereof.

At the end of the shaft that is opposite the cover for compressed-air supply, provision is advantageously made for a two-way lead-in arrangement for the temperature control medium to be supplied and discharged.

Details of the invention will become apparent from the ensuing description of a preferred embodiment, taken in conjunction with the drawing.

DESCRIPTION OF THE PREFERRED EMBODIMENT

Figure 4:
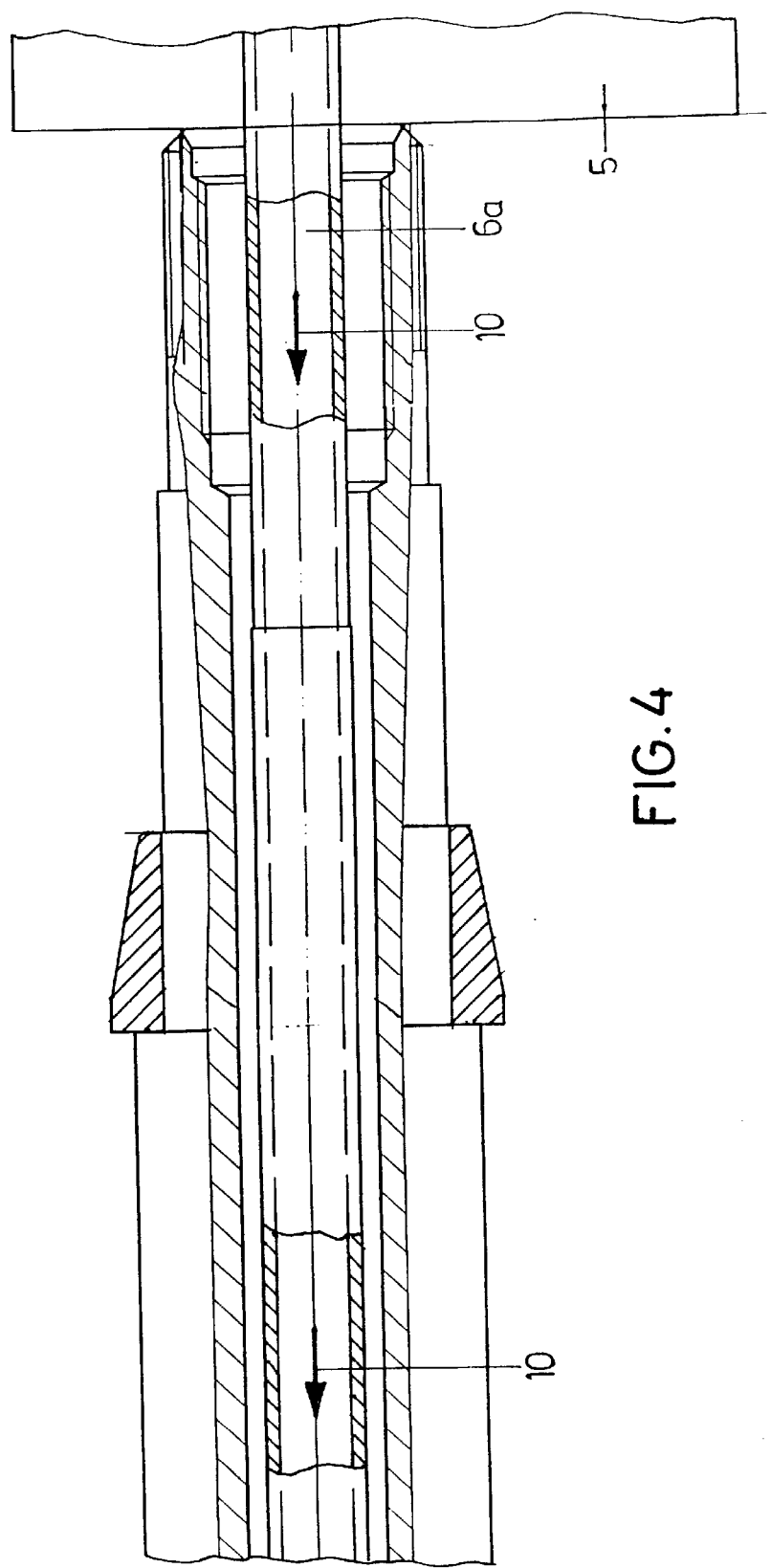
FIG. 4 is a sectional view, on an enlarged scale, of the right outer portion of FIG. 1.

As seen in the drawing, a clamping cylinder according to the invention comprises a cylinder casing 1 for a stamping mold (not shown) to be fixed, the cylinder casing 1 being equipped with frontal covers 2, 3, through which passes a rotary shaft 4. As can be seen on the right side of FIG. 4, the shaft is mounted on a gland 5; apart from that, bearings are not shown.

Figure 1:
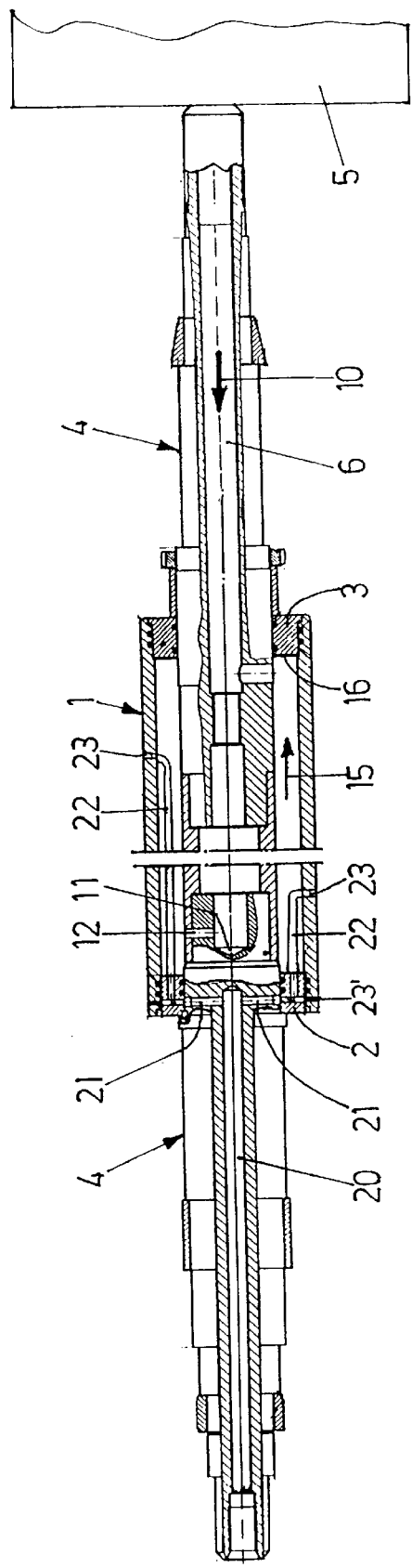
FIG. 1 is a longitudinal section through a clamping cylinder according to the invention.
Figure 3:
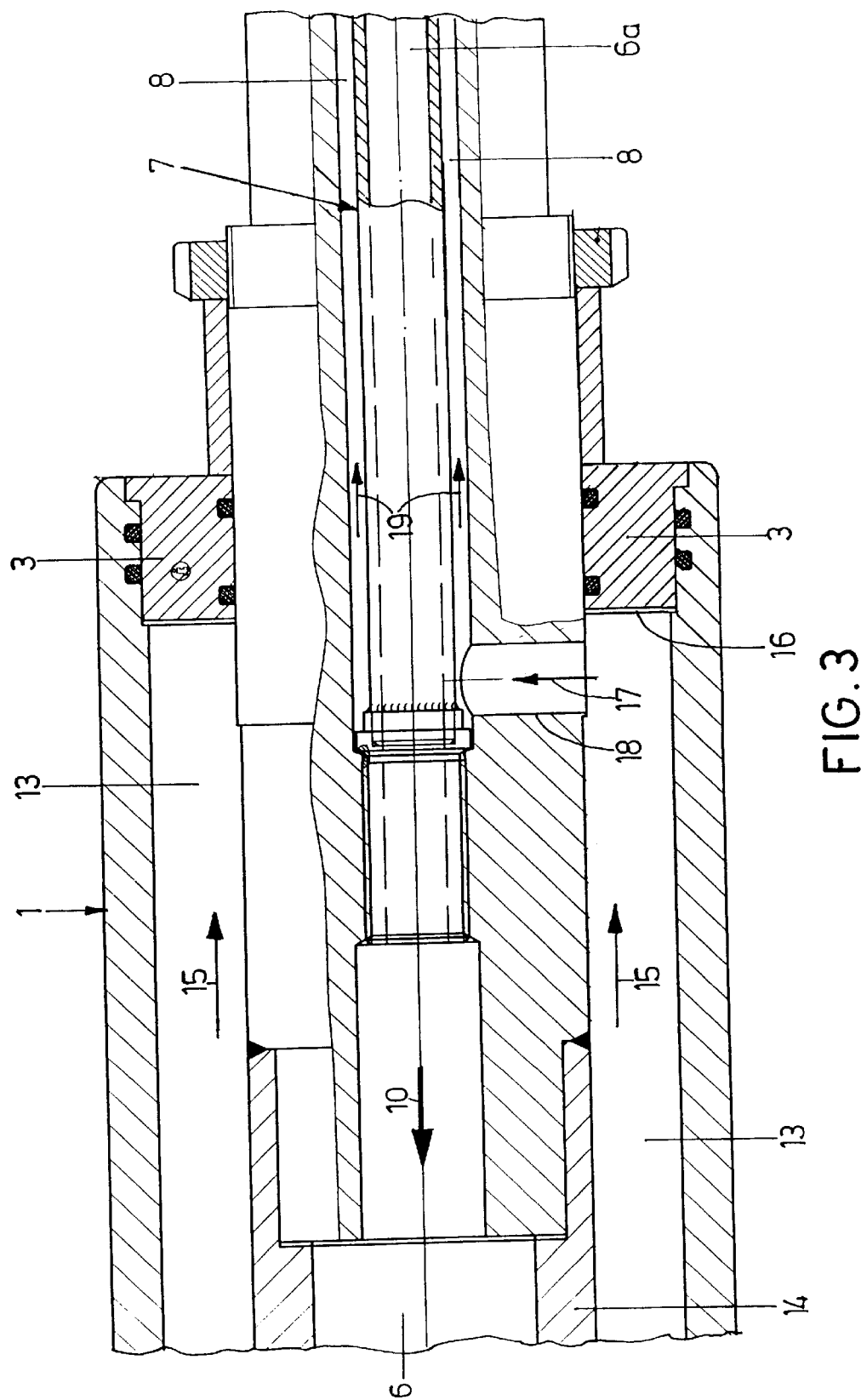
FIG. 3 is an illustration, on an enlarged scale, of the right central portion of FIG. 1.

The shaft 4 has an inner cavity 6 and, on the right of FIG. 1 (cf. FIG. 3), another cavity 8 toward the shaft 4 is formed by a supply pipe 7 (not shown in FIG. 1), whereby continuous circulation of the temperature control medium is ensured. On the right outer end of the shaft 4, provision is made for a commercial two-way lead-in arrangement (gland 5) known per se (available for instance at DEUBLIN GmbH).

Figure 2:
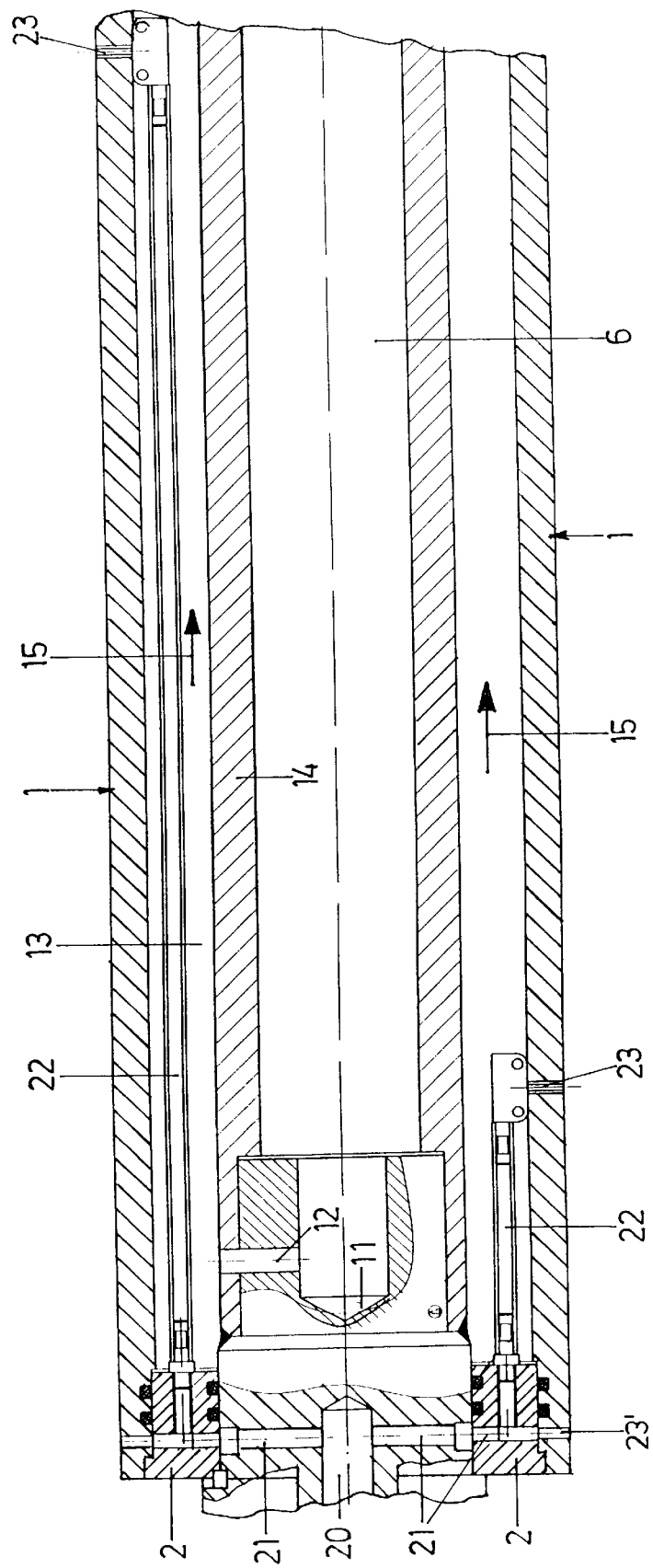
FIG. 2 is a sectional view, on an enlarged scale, of the left central portion of FIG. 1.

Correspondingly, it is possible to lead a temperature control medium, in particular water, through the supply pipe 7, the inner cavity 6a as well as the inner cavity 6 of the shaft 4 in the direction of the arrows 10 through the shaft 4 as far as to the frontal end 11, seen in FIG. 2, of the inner cavity 6, from which channels 12 extend radially outwards, opening into a cavity 13 that is formed between the central portion 14 of the shaft 4 and the cylinder casing 1. This is where the temperature control medium, while controlling the temperature of the cylinder casing 1, flows back in the direction of the arrows 15 until reaching the front wall 16 of the cover 3, from where it passes through radial bores 18 in the direction of the arrow 17 and arrives in the cavity 8 where it is returned in the direction of the arrows 19 in the shaft 4.

Correspondingly, it is possible, by means of a temperature sensor (not shown) and a control, to keep the cylinder casing 1 of the clamping cylinder at a desired, given temperature.

Positioning the stamping mold on the outside of the cylinder casing is implemented by compressed air which is fed, in the drawing from the left side, into the interspace between the outside of the cylinder casing 1 and the inside of the stamping mold that surrounds the cylinder casing 1.

The compressed air is supplied from the left through the cavity 20 and deflected outwards through radial bores 21, which are formed in the shaft 4 and the cover 2. In the cover 2, the compressed air is distributed to the bores 23' and the lines 22, as seen in FIG. 2. The lines 22 are of varying axial extension in the cavity 13. Provided at the end of each line 22 (cf. in particular FIG. 2) is a radial bore 23 in the cylinder casing 1.

By means of compressed air flowing out through the bores 23, 23', the stamping mold is expanded in the elastic area and, by way of air cushions, it may then be slipped on the clamping cylinder or its position thereon may be corrected. Fixing takes place by radial contraction of the stamping mold when the supply of compressed air is switched off.

What is claimed is:

1. A clamping cylinder for receiving and fixing a cylindrical stamping mold with a structured surface, for the production of holograms, comprising an outer cylinder casing which is closed by a frontal cover and mounted on a shaft, wherein the cylinder casing (1) is provided with a plurality of bores (23, 23') which are connected with compressed air lines (22) that lead through the interior of the cylinder casing (1) and are connectable to a compressed air source for elastically expanding the cylindrical stamping mold to determine or correct a position thereof;

wherein, inside the cylinder casing (1), a cavity (13) is provided for a temperature control medium, which circulates via inlets and outlets (6, 6a, 8);

wherein the compressed air lines (22) pass through the cavity (13) for the temperature control medium; and wherein means for supplying compressed air comprise distributing lines (21) formed in a cover (2) that closes the cylinder casing (1).

2. A clamping cylinder according to claim 1, wherein the shaft (4) is a hollow shaft, including a cavity (6, 6a) for supplying of the temperature control medium and a cavity (8) for discharging the temperature control medium.

3. A clamping cylinder according to claim 1, wherein a two-way lead-in arrangement (5) is disposed at an end of the shaft (4) which is opposite the cover (2) for compressed air supply.

4. A clamping cylinder for receiving and fixing a cylindrical stamping mold with a structured surface, for the production of holograms, comprising an outer cylinder casing which is closed by a frontal cover and mounted on a shaft, wherein the cylinder casing (1) is provided with a plurality of bores (23, 23') which are connected with compressed air lines (22) that lead through the interior of the cylinder casing (1) and are connectable to a compressed air source; and wherein, inside the cylinder casing (1), a cavity (13) is provided for a temperature control medium, which circulates via inlets and outlets (6, 6a, 8);

wherein means for supplying compressed air comprise distributing lines (21) which are formed in a cover (2) that closes the cylinder casing (1).

5. A clamping cylinder according to claim 4, wherein the compressed air lines (22) pass through the cavity (13) for the temperature control medium.

6. A clamping cylinder according to claim 4, wherein the shaft (4) is a hollow shaft, including a cavity (6, 6a) for supplying of the temperature control medium and a cavity (8) for discharging the temperature control medium.

7. A clamping cylinder according to claim 4, wherein a two-way lead-in arrangement (5) is disposed at an end of the shaft (4) which is opposite the cover (2) for compressed air supply.

* * * * *